United States Patent

[11] 3,620,318

| [72] | Inventor | Frank T. Gostomski<br>Wahoo, Nebr. 68066 |
|---|---|---|
| [21] | Appl. No. | 24,987 |
| [22] | Filed | Apr. 2, 1970 |
| [45] | Patented | Nov. 16, 1971 |

[54] TRACK TIGHTENER AND REAR IDLER SUSPENSION SYSTEM
11 Claims, 6 Drawing Figs.

[52] U.S. Cl. .................................................. 180/5 R, 305/27, 305/32
[51] Int. Cl. .................................................. B62m 27/02
[50] Field of Search ...................................... 180/5; 305/24, 27, 29–32

[56] References Cited
UNITED STATES PATENTS

| 1,276,035 | 8/1918 | Crane | 305/31 |
| 3,480,096 | 11/1969 | Hammitt | 180/5 |
| 2,314,295 | 3/1943 | Wampfler | 305/32 X |
| 3,494,438 | 2/1970 | Rose | 180/5 |

*Primary Examiner*—Richard J. Johnson
*Attorney*—Henderson & Strom

ABSTRACT: A track tightener and rear idler suspension system for an all terrain vehicle is provided which comprises two elongate brackets secured to opposing sides of the vehicle frame forwardly of the rear end. Leaf springs are secured to the brackets and extend rearwardly to proximate the rear end of the vehicle. The rear idler assembly is secured to the rear ends of the leaf springs. The brackets are movable forwardly and rearwardly to facilitate the adjustment of the track to the proper tension. Because the rear idler assembly is supported by the leaf springs, the idler assembly can be disposed rearwardly of the rear of the vehicle which prevents the vehicle from becoming hung up when crossing ditches and gullies. In addition, as more weight is added to the vehicle, the rear idler assembly is moved upwardly which automatically tightens the track and prevents slippage.

PATENTED NOV 16 1971 3,620,318

INVENTOR
FRANK T. GOSTOMSKI
BY Henderson & Strom
ATTORNEYS

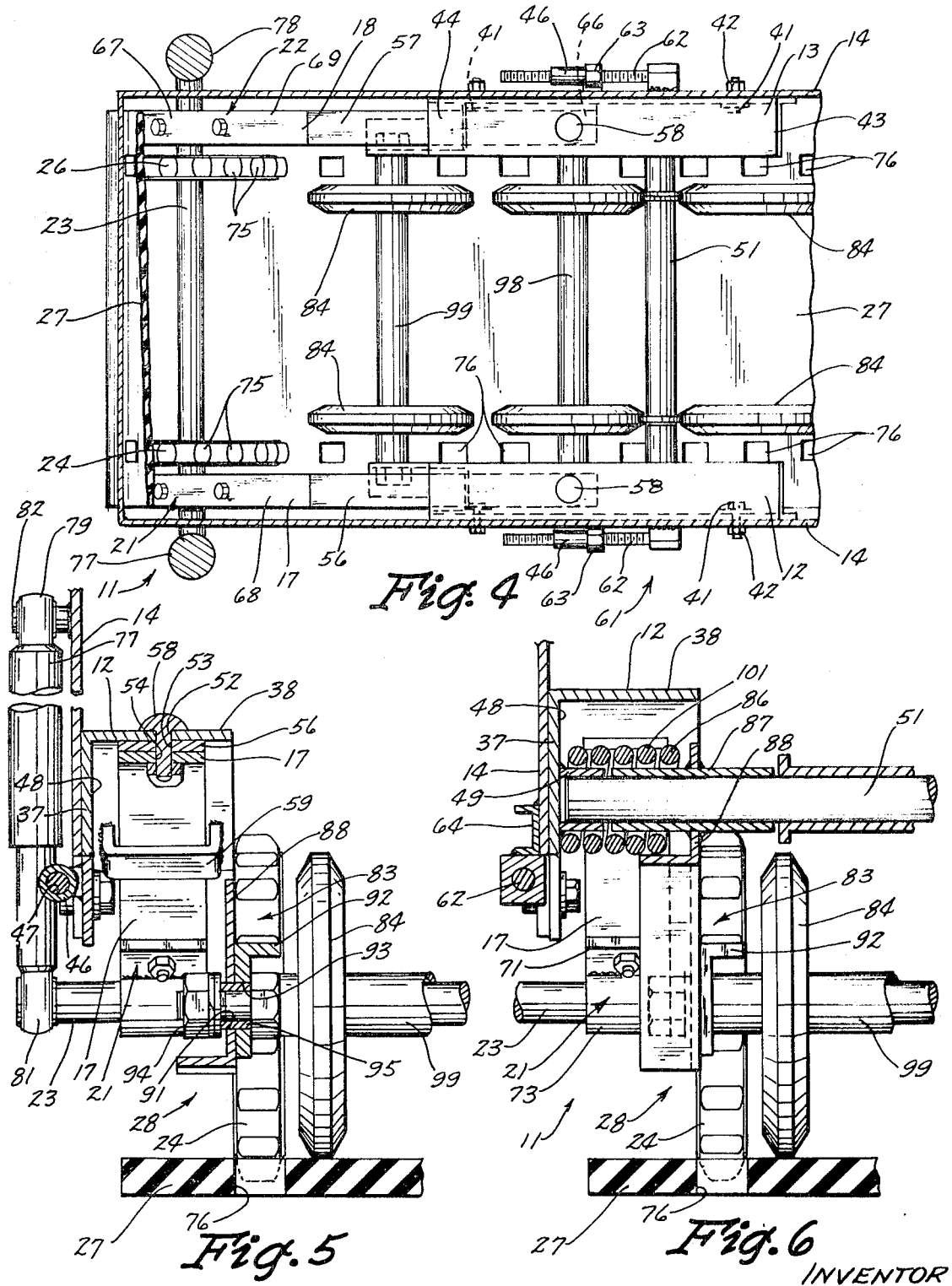

TRACK TIGHTENER AND REAR IDLER SUSPENSION SYSTEM

BACKGROUND OF THE INVENTION

This invention relates to a track tightener and rear idler suspension system for an all terrain vehicle. The rear idler assembly is supported by leaf springs which, in turn, are secured to adjustable brackets.

Prior to this invention, the rear idler assemblies of these vehicles had been rigidly secured to the rear ends of the vehicles. Of necessity, the rear idler assemblies were disposed below the frames of the vehicles. When these vehicles were utilized to cross ditches or gullies, they were easily hung up; that is, the frame contacted the ground and prevented the track from engaging the ground.

This invention is designed to prevent all terrain vehicles from becoming hung up in crossing ditches and gullies. The leaf spring suspension of the rear idler assembly allows the rear idler assembly to extend rearwardly of the vehicle and thereby prevents the frame from contacting the ground. In addition, the leaf springs soften the ride of the vehicle. An additional and important feature of this invention is that the leaf springs and rear idler suspension system can be moved forwardly and rearwardly to adjust the tension on the track.

SUMMARY OF THE INVENTION

This invention relates to a track tightener and rear idler suspension system for an all terrain vehicle having a frame, a front end and a rear end, a drivable endless track for motive power and means for driving the track. The track tightener and rear idler suspension system comprises two elongated brackets secured to the frame, either inside or outside the frame, in lateral alignment and longitudinally of the frame, the brackets being adjustably secured along opposing sides of the frame forwardly of the rear end and movable forwardly and rearwardly. Leaf springs are secured to the brackets and extend rearwardly of the brackets to proximate the rear end of the vehicle. Mounting means are secured to the rear ends of the leaf springs and secure an axle therebetween. Idler wheels are rotatably mounted on the axle and guide the track.

An object of this invention is to provide an improved combination track tightener and rear idler suspension system for an all terrain vehicle.

Another object is to provide a track tightener and rear idler suspension system wherein the rear idler assembly is supported by leaf springs.

A further object is to provide a belt tightener and rear idler suspension system wherein the rear idler assembly can be moved forwardly and rearwardly to adjust the tension on the track.

Another object is to provide a track tightener and rear idler suspension system which automatically tightens the track with the addition of weight to the vehicle.

BRIEF DESCRIPTION OF THE DRAWINGS

FIG. 4 is a cross-sectional view of the track tightener and rear idler suspension system taken along line 4—4 of FIG. 2.

FIG. 5 is a magnified cross-sectional view of the track tightener and rear idler suspension system taken along line 5—5 of FIG. 2.

FIG. 6 is a magnified cross-sectional view of the track tightener and rear idler suspension system taken along line 6—6 of FIG. 2.

DESCRIPTION OF THE PREFERRED EMBODIMENTS

Figure 1:
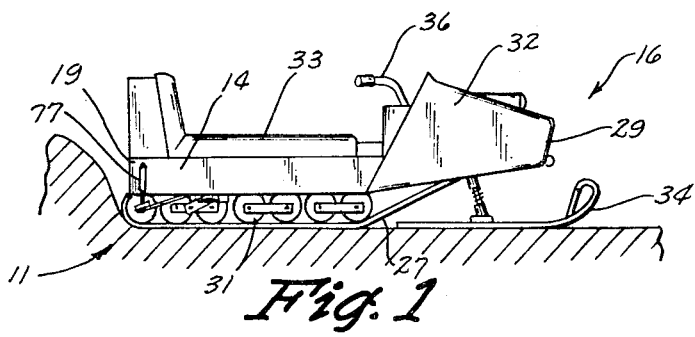
FIG. 1 is a side view of an all terrain vehicle utilizing the track tightener and rear idler suspension system of this invention.

Referring now to the drawings, the track tightener and rear idler suspension system of this invention is indicated generally at 11 in FIGS. 1–6. The track tightener and rear idler suspension system 11 comprises two elongate brackets 12 and 13 (FIGS. 2–6) movably secured to the frame 14 of the vehicle 16. Leaf springs 17 and 18 (FIGS. 2–6) are secured to the brackets 12 and 13 and extend rearwardly to proximate the rear end 19 of the vehicle 16. Mounting means 21 and 22 are secured to the leaf springs 17 and 18 and support the axle 23 laterally therebetween. Idler wheels 24 and 26 are rotatably mounted on the axle 23 and guide the track 27. A bogie wheel assembly, indicated generally at 28, (FIGS. 5–6), is secured to and movable with the brackets 12 and 13.

More specifically, the track tightener and rear idler suspension system 11 is utilized with a conventional snowmobile 16 or all terrain vehicle (FIG. 1). The vehicle 16 has a front end 29 and a rear end 19, a drivable endless track 27 and means (not shown) for driving the track 27. At least one set of bogie wheels 31 is secured to the frame 14 and is utilized to maintain the track 27 in contact with the ground. A light gauge metal shell 32 is secured to the frame 14 of the vehicle 16 and a seat 33 is disposed over the rear end 19 of the vehicle 16. The front end 29 of the vehicle 16 is supported on skis 34 which are steerable with a rotatable steering bar 36.

The track tightener and rear idler suspension system 11 utilizes two elongate brackets 12 and 13 (FIGS. 2–6) which may be disposed either inside or outside the frame 14 in lateral alignment and longitudinally of the frame 14. The brackets 12 and 13 are adjustably secured along opposing sides of the frame 14 forwardly of the rear end 19 and movable forwardly and backwardly a predetermined distance.

The brackets 12 and 13 (FIGS. 5–6) are, preferably, of L-shaped configuration in cross section. Each of the brackets 12 and 13 has one leg 37 which depends downwardly along the side of the frame 14 and the other leg 38 extends inwardly of the frame 14.

Figure 2:
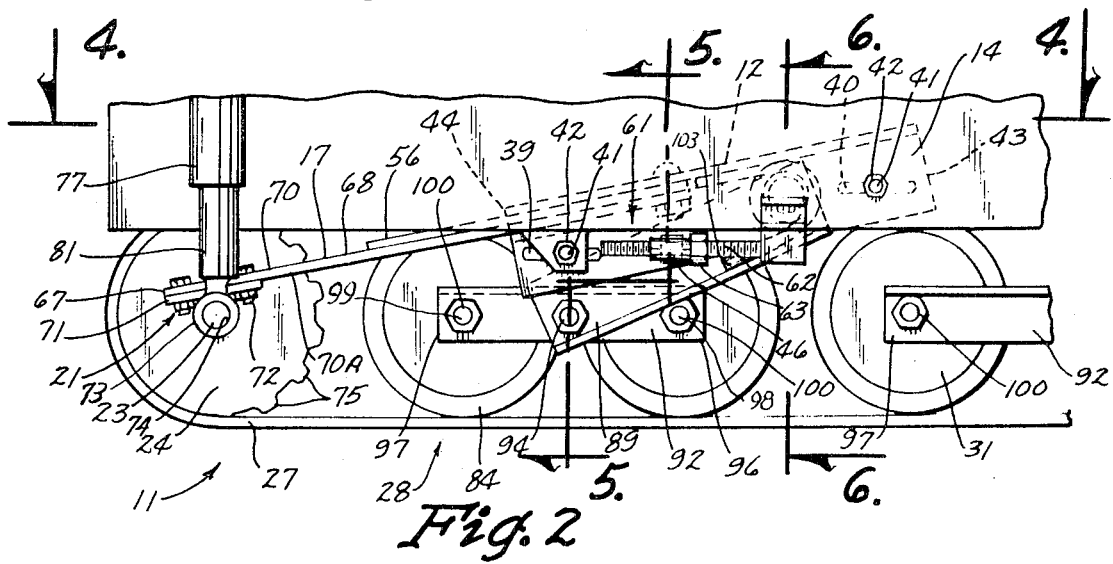
FIG. 2 is an enlarged side view of the rear end of the vehicle of FIG. 1 with the front end of the vehicle cut away. The invention is shown partially in phantom.
Figure 3:
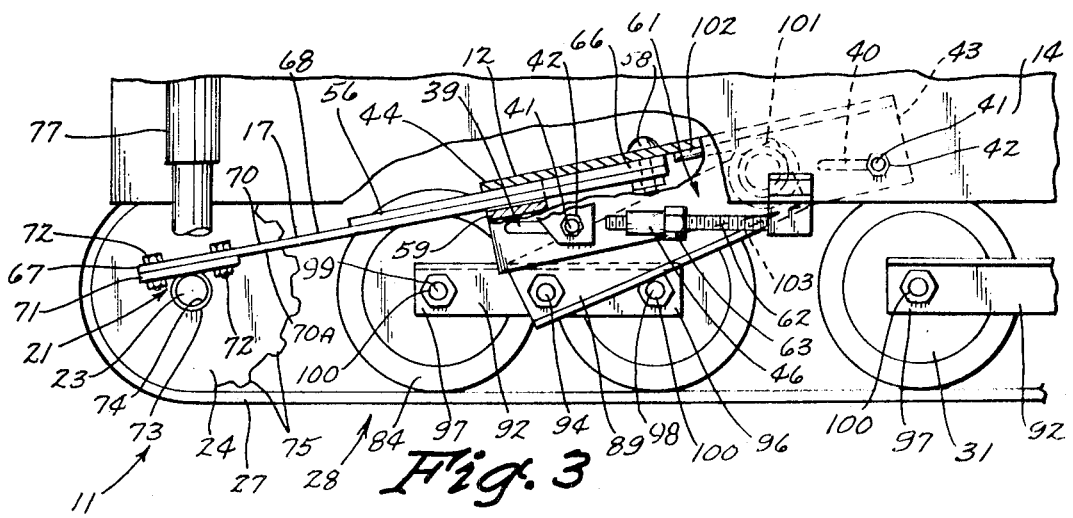
FIG. 3 is a side view of FIG. 2 wherein the frame of the vehicle is partially cut away.

The slots 39 and 40 (FIGS. 2–3) are formed through each of the downwardly depending legs 37. The slots 39 and 40 are formed to allow the brackets 12 and 13 to be moved horizontally when secured to the frame 14 as shown in FIGS. 2–4. Bolts 41 are inserted through apertures formed in the frame 14 and are secured therein with nuts 42. When the nuts 42 are loosened, the brackets 12 and 13 can be adjustably moved forward or rearwardly along the frame 14 at a predetermined distance, i.e., the length of the slots 39 and 40.

The brackets 12 and 13 preferably slope downwardly from the front end 43 to the rear end 44 (FIGS. 2–3). In one embodiment, at the front end 43, the brackets 12 and 13 are completely enclosed by the frame 14 and shell 32 while at the rear end 44, the brackets 12 and 13 are nearly totally exposed. Intermediate of the front end 43 and rear end 44, a guide member 46 (FIG. 5) is secured to the downwardly depending leg 37 and extends under and outwardly of the frame 14. An aperture 47 is formed through the guide member 46, the axis of the aperture 47 being horizontally disposed and facing forwardly.

In another embodiment (not shown) the brackets 12 and 13 are secured to the outside of the frame 14 to facilitate assembly line construction. Conventional track-tightening assemblies can be utilized to move the brackets 12 and 13 forwardly and backwardly. Generally, in this embodiment, the bogie wheel assembly 28 is not movable with the brackets 12 and 13.

Referring again to the drawings, on the inside surface 48 of each of the downwardly depending legs 37 (FIG. 6), a journal box 49 is formed and is utilized to secure therein a mounting axle 51. The mounting axle 51 extends laterally between the brackets 12 and 13 and is utilized to mount the bogie wheel assembly 28.

A hole 52 (FIG. 5) is formed through the inwardly extending leg 38 intermediate the ends 43 and 44. Similar holes 53 and 54 are formed through, respectively, the helper springs 56 and 57 and the leaf springs 17 and 18 to the brackets 12 and 13. If tapered leaf springs 17 and 18 are utilized herein, helper springs 56 and 57 are not required.

A U-shaped strap 59 is rigidly affixed proximate the rear end of each of the brackets 12 and 13 on the inwardly extending legs 38. The strap 59 is utilized for securing the leaf springs 17 and 18 and the helper springs 56 and 57 to the brackets 12 and 13. As used herein, leaf springs include any elongated support which resiliently supports the idler wheels. These supports include resilient rods and the like.

Means 61 (FIGS. 2–4) are provided for adjustably moving the brackets 12 and 13 forwardly and backwardly. The distance that the brackets 12 and 13 are movable is governed primarily by the length of the slots 39 and 40 and the play in the track 27. The means 61 comprises the guide members 46, previously described, threaded members 62 secured to the frame 14, and nuts 63 threadably engaged on the threaded member 62. The threaded member 62 is preferably horizontally disposed and passes through the aperture 47 in the guide member 46. As shown in FIG. 6, the threaded member 46 is secured to the frame 14 and may be reinforced with a U-channel 64. The nut 63 is threadably engaged with the threaded member 62 forwardly of the guide member 46.

The track 27 maintains the guide members 46 flush against the nuts 63. Tension on the track 27 can be adjusted by either tightening or loosening the nuts 63. Of course, prior to adjusting the nuts 63, the nuts 42 must be loosened to allow the brackets 12 and 13 to move forwardly or rearwardly. The tension on the track 27 is generally adjusted to compensate for wear in the parts supporting the track 27 and to compensate for stretching and wear of the track 27.

Leaf springs 17 and 18 (FIGS. 2–5), each having a front end 66 and a rear end 67 are secured to the brackets 12 and 13 proximate the front ends 66. The leaf springs 17 and 18 extend through the U-straps 59 and are secured to the inwardly extending legs 38 of the brackets 12 and 13 by the bolts 58. The leaf springs 17 and 18 extend rearwardly along opposing sides of the frame 14 to proximate the rear end 19 of the vehicle 16. The leaf springs 17 and 18 can be fabricated from spring steel.

The length of the leaf springs 17 and 18 depends on the desired position of the rear idler system and the desired resiliency. Apertures (not shown) are formed through the rear ends 67 of the leaf springs 17 and 18 to facilitate securement of the mounting means 21 and 22 to the leaf springs 17 and 18.

Helper springs 56 and 57 (FIGS. 2–4) are preferably secured between each of the leaf springs 17 and 18 and the inwardly extending legs 38 of the brackets 12 and 13. The helper springs 56 and 57 extend along the upper surfaces 68 and 69 of the leaf springs 17 and 18 from proximate the front ends 66 to intermediate the front ends 66 and the rear ends 67. The helper springs 56 and 57 help to minimize the large shear forces in the leaf springs 17 and 18 proximate the rear ends 44 of the brackets 12 and 13. If tapered leaf springs 17 and 18 are utilized, the helper springs 56 and 57 can be eliminated.

Mounting means 21 and 22 (FIGS. 2–3) are secured to the rear ends 67 of each of the leaf springs 17 and 18. The mounting means 21 and 22 each comprise a mounting plate 71 secured, generally by nuts and bolts 72, to either the upper surfaces 70 or the lower surfaces 70A of the leaf springs 17 and 18. A bushing 73 is welded to each of the mounting plates 71. The apertures 74 in the bushings 73 are laterally aligned to rotatably receive the axle 23 for mounting the idler wheels 24 and 26. The axle 23 extends laterally between the bushings 73 and lends strength to the track tightener and rear idler suspension system 11 of this invention.

Two idler wheels 24 and 26 (FIGS. 2–5) are mounted on the axle 23 and are utilized to guide the track 27. Teeth 75 are formed on the idler wheels 24 and 26 which are spaced and aligned to coincide with longitudinally spaced openings 76 (FIG. 4) in the track 27. The teeth 75 each engage the portion of the track 27 around the openings 76 and guide the track 27 around the idler wheels 24 and 26.

Hydraulic shock absorbers 77 and 78 (FIGS. 2 and 4), having an upper end 79 and a lower end 81 are secured, at the upper ends 79 to lugs 82 formed on the frame 14 and at the lower ends 81 to the axle 23 or to the leaf springs 17 and 18. The shock absorbers 77 and 78 dampen the action of the leaf springs 17 and 18 and provide a smoother, less violent ride.

A bogie wheel assembly 28 (FIGS. 5 and 6) is secured to the mounting axle 51 and comprises a bogie wheel mounting assembly 83, bogie wheels 84, and spring means 86. The bogie wheel mounting assembly 83 is rotatably secured to the mounting axle 51. In FIGS. 5 and 6, one-half of the bogie wheel mounting assembly 83 is illustrated and comprises an elongated bushing 87 encompassing the mounting axle 51 and an angle iron 88 secured thereto, as by welding. The angle iron 88 extends obliquely rearwardly and downwardly and, at its rear end 89, has an aperture 91 formed therethrough. A second angle iron 92, generally horizontally disposed and having an aperture 93 formed therethrough intermediate its ends is rotatably secured to the first angle iron 88 by means of nuts and bolts 94 which pass through the apertures 91 and 93. A bushing 95 is first disposed in the apertures 91 and 93 to insure that the second angle iron 92 is rotatable on the first angle iron 88.

Proximate the ends 96 and 97 of the second angle irons 92, holes (not shown) are drilled for securing the bogie wheel axles 98 and 99 therein. The axles 98 and 99 are laterally aligned and secured by nuts 100 to the second angle irons 92. Bogie wheels 84 are rotatably mounted on the axles 98 and 99 and generally bear against the track 27.

Coiled springs 101 (FIGS. 3 and 6) are secured around the mounting axle 51 between the brackets 12 and 13 and the first angle irons 88. One end 102 of the spring 101 bears against the inwardly extending leg 38 of the bracket 12 and the other end 103 bears against the first angle iron 88. The springs 101 thereby continually urge the bogie wheels 84 downwardly against the track 27.

Because the bogie wheel assembly 28 is secured directly to the brackets 12 and 13, the bogie wheel assembly 28 moves with the rear idler assembly when the brackets 12 and 13 are moved forwardly or rearwardly.

Although a preferred embodiment has been described hereinbefore, it is to be remembered that various modifications may be made without departing from the invention as defined in the appended claims.

I claim:

1. In an all terrain vehicle having a frame including a pair of laterally spaced vertically extending sidewalls, a front end and a rear end, a drivable endless track disposed at least partially between the sidewalls for motive power and means for driving the track; a combined track tightener and rear idler suspension system comprising:
   two elongated brackets secured to the frame in lateral alignment and generally longitudinally of the frame; said brackets being adjustably secured along opposing sides of the frame forwardly of the rear end and movable forwardly and rearwardly a predetermined distance;
   means for adjustably moving said brackets forwardly and rearwardly;
   leaf spring means each having a front end and rear end, said leaf spring means being secured to said brackets proximate said front ends and extending rearwardly thereof to proximate the rear end of the vehicle;
   mounting means secured to the rear ends of said leaf spring means;
   an axle extending laterally between said mounting means; and
   idler wheels mounted on said axle for guiding the endless track.

2. The track tightener and rear idler suspension system of claim 1 wherein said brackets are disposed outside the frame.

3. The track tightener and rear idler suspension system of claim 1 wherein said brackets are disposed inside the frame.

4. The track tightener and rear idler suspension system of claim 3 wherein:
said brackets, in cross section, are of substantially L-shaped configuration with one leg depending downwardly along the side of the frame and the other leg extending inwardly of the frame; and
said leaf spring means are each secured to the leg extending inwardly of the frame.

5. The track tightener and rear idler suspension system of claim 4 wherein:
two substantially horizontal slots are formed through each of the downwardly depending legs of said brackets; and
a bolt extends through each of said slots and through an aperture formed in the frame thereby adjustably securing said brackets to the frame.

6. The track tightener and rear idler suspension system of claim 5 wherein:
a mounting axle extends laterally between said brackets and is secured to said brackets;
a bogie wheel mounting assembly is rotatably secured to said mounting axle;
bogie wheels are rotatably mounted on said bogie wheel mounting assembly and normally bear against the track; and
second spring means urge said bogie wheels against the track.

7. The track tightener and rear idler suspension system of claim 6 wherein:
each of said mounting means comprises a mounting plate and a bushing, the bushing being secured to said plate and aligned to receive said axle; said plates being secured to the rear ends of said leaf spring means.

8. The track tightener and rear idler suspension system of claim 7 wherein each of said means for adjustably moving said brackets forwardly and rearwardly comprises:
a guide member having an aperture formed therethrough secured to said brackets and extending outwardly of the frame;
a threaded member secured to the frame, substantially horizontally disposed, and passing through said aperture in said guide member; and
a nut threadably engaged on said threaded member for adjustably moving said guide member and said bracket forwardly and rearwardly.

9. The track tightener and rear idler suspension system of claim 8 wherein:
a helper spring is secured between each of said leaf spring means and said inwardly extending legs of said brackets;
said helper springs extending along the upper surface of said leaf spring means from proximate said front ends to intermediate of said front and rear ends of said leaf spring means.

10. The track tightener and rear idler suspension system of claim 9 wherein
shock absorbers each having an upper end and a lower end are secured at said upper ends to the frame and depend downwardly and are secured, at said lower ends, to said axle.

11. The track tightener and rear idler suspension system of claim 10 wherein
said brackets slope downwardly from the front end to the rear end; and wherein
a U-shaped strap is formed on each of said inwardly extending legs and utilized for securing said leaf spring means and said helper springs to said brackets.

* * * * *